US005363564A

United States Patent [19]

Harley et al.

[11] Patent Number: 5,363,564

[45] Date of Patent: Nov. 15, 1994

[54] PRINTING PLATE MOUNTING AND PROOFING MACHINE AND METHOD FOR USING SAME

[75] Inventors: Richard E. Harley, New York; Erik Mikkelsen, Selden, both of N.Y.

[73] Assignee: E. L. Harley Inc., Brooklyn, N.Y.

[21] Appl. No.: 52,067

[22] Filed: Apr. 22, 1993

[51] Int. Cl.[5] .......................... B41C 1/18; G06F 15/46

[52] U.S. Cl. .......................... 33/618; 33/620; 33/621; 101/248; 101/DIG. 36

[58] Field of Search .................. 33/618, 614, 617, 619, 33/620, 621; 364/469; 352/156; 101/174, 248, DIG. 36

[56] References Cited

U.S. PATENT DOCUMENTS 4,495,583 1/1985 Punater .................... 33/617 X
4,520,730 6/1985 Edelmann .................... 33/617 X
5,097,763 3/1992 Simeta .................... 33/621 X
5,132,911 7/1992 Leader, Jr. et al. .............. 33/618 X
5,170,708 12/1992 Di Lalla .................... 364/469 X

*Primary Examiner*—Christopher W. Fulton
*Attorney, Agent, or Firm*—Jordan and Hamburg

[57] ABSTRACT

The positions of horizontal lines on a layout cylinder of a printing plate mounting and proofing machine are located with automatic compensation for stretch that results from various parameters such as the diameter of a printing cylinder on which the layout will be used, and the thicknesses of the printing plates and printing plate backing. A display of the circumferential displacement of the layout cylinder, as the cylinder is rotated, provides the displacement with the necessary compensation for stretch, rather than the actual cylinder displacement.

14 Claims, 2 Drawing Sheets

PRINTING PLATE MOUNTING AND PROOFING MACHINE AND METHOD FOR USING SAME

FIELD OF THE INVENTION

This invention relates to a printing plate mounting an proofing machine, and is especially directed to the provision of a printing plate mounting and proofing machine for corrugated boxes, and a method for using the machine.

BACKGROUND OF THE INVENTION

Printing plate mounting and proofing machines have been disclosed, for example, in U.S. Pat. Nos. 2,493,628, E. L. Harley; 2,561,115, E. L. Harley and 5,058,287, R. Harley. The machines of these patents, however, were not specifically designed for mounting and proofing plates for printing corrugated boxed.

One type of conventional printing plate mounting and proofing machine especially adapted for proofing printing plates for printing of blanks for corrugated boxes, has been provided with an upper or layout cylinder upon which a paper layout sheet for drawing a layout pattern may be mounted by conventional means, and a lower or plate cylinder upon which printing plates are mounted for proofing.

In one technique for using a machine of this type for mounting and proofing printing plates for a corrugated box printing press, a sheet of paper was initially mounted on the upper cylinder of the machine, and a full size layout of the box blank was drawn on the paper. The machine was provided with means for enabling the drawing of vertical and horizontal lines on the paper corresponding to determined positions of a corrugated box blank to be printed. Thus, in a conventional process, the user is enabled to draw lines on the paper corresponding to the outlines of the blank, the score lines of the blank, and the locations for printing plates. The printing plate locations generally correspond to the centers of the printing plates, since printing plates are usually provided with marks indicating the central axes thereof. In the drafting of the layout of the box on the layout sheet on the layout cylinder, the dimensions of the plan correspond to the full size of the box. This full size layout was used to mount the prepared printing plates in the desired pattern on the plate cylinder.

In such a machine, it was generally desirable to employ a plate cylinder of the same diameter as the printing cylinder that was to be used in a printing press. If the plate cylinder was not of the same diameter as the printing cylinder, a problem arose in the location of the printing on the box blank, resulting from "stretching". Thus, plates are manufactured to have the proper dimensions for a printing cylinder of a determined diameter. If the curvature of the printing cylinder is greater than design curvature, i.e. if the diameter of the printing cylinder is smaller than the design diameter of the printing plate, then, due to its finite thickness, it will stretch when it is mounted on the printing cylinder. For example, if a plate is designed for a 66 inch cylinder, and it is used on a 50 inch cylinder, the print that results from use of the plate will be elongated. Similarly, if the curvature of the printing cylinder is greater than the design diameter, the pattern on the plate will be compressed when it is mounted on the printing cylinder. The thickness of the printing plate and backing of the plate are also factors in the amount of stretch that will occur.

A similar problem occurs when more than one plate is to be mounted on the printing cylinder, for example at spaced apart locations such that the impression of each plate appears on a different side of a finished box. In this case, if the curvature of the printing cylinder is different than the curvature of the plate cylinder on the proofing machine, the impressions from the different plates that are printed on the box blank will be spaced apart by distances such that the impressions do not appear at the desired locations on the side of the box.

It is for this reason that it has been desirable to provide a plate cylinder that has the same diameter as the printing press cylinder. This solution results in the problem, however, that it becomes necessary to frequently change the plate cylinder on the proofing machine, in order to avoid the necessity for compensating for stretch. The plate cylinders, however, may be quite large and heavy, so that changing them on the proofing machine is difficult and time consuming.

In the above solution to the problem of stretch, the layout on the layout cylinder was designed to be of the same size as the pattern on the box, with the same spacings, etc. In another solution to the problem, it has been suggested that the layout pattern be made of a size that compensates for stretch, so that a single size of plate cylinder may be employed for all sizes of printing press cylinders. For this purpose, the layout pattern was prepared on a flat table, using a "stretch" ruler on which the calibrations were adjusted to compensate for stretch. For example, on a ruler that was designed for layout on a proofing machine having a 66 inch circumference, to proof plates for use on a printing press cylinder having a circumference of 50 inches, a calibrated ruler is employed to dimension the layout, wherein the actual dimensions are different than the dimensions indicated on the scale of the ruler. In this solution, a separate calibration scale or ruler must be employed for each size combination of cylinders, and the accuracy of stretch compensation is limited by the difficulty of accurately employing the markings on the scale.

In a further solution, it has been suggested that the proofing machine be provided with an additional plate cylinder on the side thereof opposite the first plate cylinder. In this solution, the two plate cylinders have different diameters, to correspond to the diameters of the two printing press cylinders that are used most often. While this solution reduces the need to change plate cylinders as often, it greatly increases the cost and size of the proofing and mounting machine, and does not provide any advantage when printing press cylinders have other dimensions.

A further problem exists in the use of the plate mounting and proofing machine, in that the sizes of the various printing cylinders are not standardized, and considerable variation exists in the sizes of cylinders that are nominally of the same size. Thus, a cylinder that is nominally called a 66 inch cylinder may in fact have a circumference of, for example, 65 to 67 inches. Such variation of course reduces the accuracy of any prior solution to the problem of compensating for stretch.

SUMMARY OF THE INVENTION

It is therefore the object of the present invention to provide a method and apparatus for proofing that overcomes the above discussed disadvantages of known techniques and devices.

It is a specific object of the invention to provide a method and apparatus for proofing and mounting plates that obviates the necessity for changing plate cylinders on the machine, and that enables the accurate compensation of stretch, regardless of difference in sizes of the plate cylinder and the cylinder of a printing press which will be employed to imprint a box blank.

Briefly stated, in accordance with the invention, a machine for producing a layout pattern for mounting printing plates on a printing cylinder of a printing press, comprises a rotatable layout cylinder. The layout cylinder is adapted to hold a layout sheet thereon by conventional means. An encoder is provided for encoding rotation of the layout cylinder. The output of the encoder is directed to a computer for determining the amount that the layout cylinder should be rotated to locate the positions for horizontal lines on the layout sheet, if the layout is to be compensated for stretch. This compensated distance is displayed on a display device, in order to enable the user to rotate the layout cylinder the correct amount to produce a layout pattern compensated for stretch. In other words, the display device displays the correct rotation of the layout cylinder to compensate for stretch rather than actual circumferential displacement of said layout cylinder.

A layout pattern formed on the printing plate mounting and proofing machine of the invention may thus be employed to accurately locate the positions for mounting printing plates on a printing cylinder of a printing press, without requiring the use of a plate cylinder of the same size as the printing press cylinder.

BRIEF DESCRIPTION OF THE FIGURES

In order that the invention may be more clearly understood, it will now be disclosed in greater detail with reference to the accompanying drawings, wherein.

DESCRIPTION OF THE PREFERRED EMBODIMENTS

Figure 1:
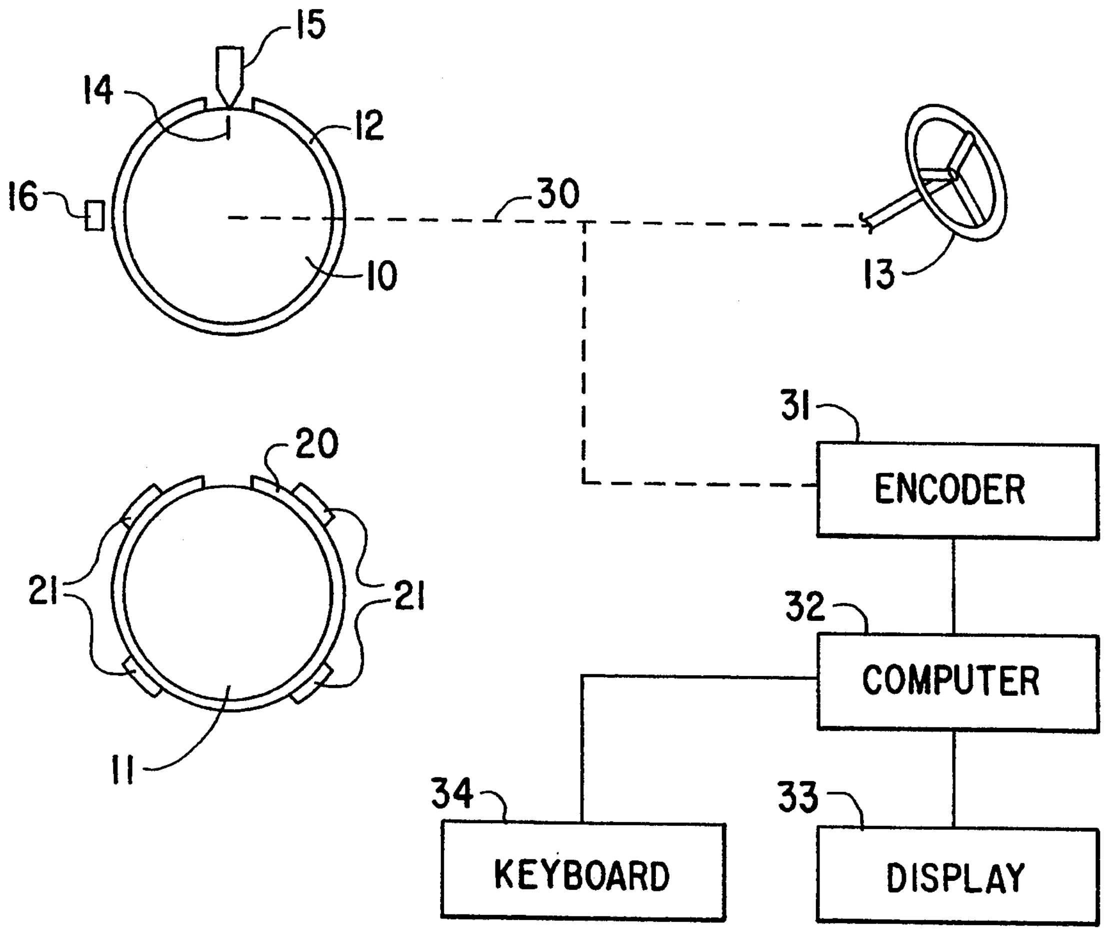
FIG. 1 is a sketch illustrating a printing plate mounting and proofing machine in accordance with one embodiment of the invention.

In accordance with one embodiment of the invention, as illustrated in FIG. 1, a printing plate mounting and proofing machine is comprised of an upper or layout cylinder 10 and a lower or plate cylinder 11. The layout cylinder 10 is adapted to have a layout paper 12 mounted therearound by conventional techniques, for example by gluing. The layout cylinder and plate cylinder are mounted by conventional means for rotation on horizontally spaced apart axes, and suitable conventional means (not illustrated) are provided to enable adjustment of the distances between these axes. In the embodiment of the invention illustrated in FIG. 1, a handwheel 13 is provided for enabling manual rotation of the layout cylinder. In addition, the layout cylinder is provided with an index position 14 alignable with a fixed index position 15 on the machine upon rotation of the cylinder 10. A fixed straight edge 16 is provided adjacent the cylinder 10, and parallel to the axis thereof, spaced a distance from the surface of this cylinder to enable drawing horizontal lines on a layout paper mounted on the cylinder. Suitable conventional means are provided to assist in the drawing of vertical lines on the paper 12.

During the process of proofing, a backing sheet 20 may be mounted on the surface of the plate cylinder 11, and one or more circumferential spaced printing plates 21 mounted on the cylinder 11. Further printing plates may also be provided spaced in the axial direction on this cylinder. The mounting of the plates 21 is effected by any conventional means, such as for example by glue, and the technique for aligning them, with respect to the layout 12 is also conventional. The plate cylinder is rotatable by conventional means with the layout cylinder, during proofing. This latter means is not illustrated herein since it is of no concern to the method and apparatus of the invention.

In accordance with the invention, the cylinders 10 and 11 may be of the same size—i.e. of the same diameter and circumference, since there is no longer any need to interchange plate cylinders in dependence upon the expected diameter of the printing cylinder that will be employed to print the box blanks. The shaft 30 of the layout cylinder 10 is coupled to a shaft encoder 31 of conventional type that provides an output that is a function of the angular or circumferential displacement of the layout cylinder. This output is directed to a computer 32 or other calculating device for performing a calculation that will be explained in detail hereinafter, and the computer outputs a signal to a display device 33. A suitable input device, such as a keyboard 34, is provided to enable inputting of various parameters to the computer.

In accordance with the invention, the computer 32 contains a program that is responsive to the output from the shaft encoder 31, to enable the display, on the display device 33, of a compensated numerical quantity corresponding to a rotation of the layout cylinder, taking into consideration certain parameters of the system. The display on the device will be more readily understood from the following example of use of the device.

In accordance with the invention, a layout paper sheet 12, such as a white paper, is mounted in conventional manner on the layout cylinder 10. The layout cylinder is initially manually rotated so that its index position 14 is aligned with the fixed index position 15, and the program of the computer 32 is initialized, for example by a suitable entry into the keyboard 34. A layout of the box blank to be printed is now drawn on the layout paper 12, to show for example the outlines of the blank, the score lines, and center lines of the printing plates. Vertical lines on the paper are drawn full size, i.e. using the actual dimensions of the blank. For this purpose, the machine may be provided with a conventional fixed horizontal scale to facilitate locating the positions of the vertical lines, as well as a conventional edge extending around the circumference of the layout cylinder as a guide for drawing the vertical lines.

In drawing the horizontal lines on the layout sheet, the user manually rotates the handwheel 13 until the display device 33 displays the desired circumferential displacement. For example, assuming that a box is to have a 24 inch panel between upper and lower 6 inch flaps, a first horizontal line will be drawn on the layout 12 at the index position. If the upper flap is to be printed with a plate oriented at the center of this flap, the layout cylinder is now rotated until the display 33 reads 3 inches. The actual rotation of the cylinder at this time, however, is not 3 inches unless the printing press cylinder has a diameter that is exactly the same as that of the plate cylinder 11. The displayed dimension is a dimension that has taken into consideration the various factors that lead to stretching, such as the relative sizes of the plate cylinder and printing press cylinder, and the thicknesses of various material such as the thicknesses of the plates and backing sheets.

Following the location of the center of the first flap, a horizontal line is drawn at this location. Then the score line of the first flap is located and drawn, the center line of the plate for the panel is located and drawn, the score line of between the panel and the lower flap is located and drawn, the center line of a plate for the lower flap is located and drawn, and the location of the bottom of the lower flap is located and drawn, in the same manner. The mounting and proofing of the plates on the plate cylinder may then follow in accordance with conventional procedure.

In order to mount the plates on the printing press cylinder, the locations are determined using the layout paper sheet as prepared above. For example, the layout paper may be mounted on the printing press cylinder, by gluing and the printing plates mounted on the thus mounted layout, employing the centerlines of the layout as guides for the accurate location of the plates. The blanks may then be printed in accordance with conventional procedures.

It is apparent that the encoder may provide very accurate shaft displacement data to the computer 32, and that the numerical display on the display device 33 may hence be very precise. For example, the numerical display on the display device may present the compensated numerical quantity accurate to thousandths of an inch, an accuracy that was not possible with the prior techniques and devices. The layout sketch of the locations of the printing plates is accordingly very exact.

Figure 2:
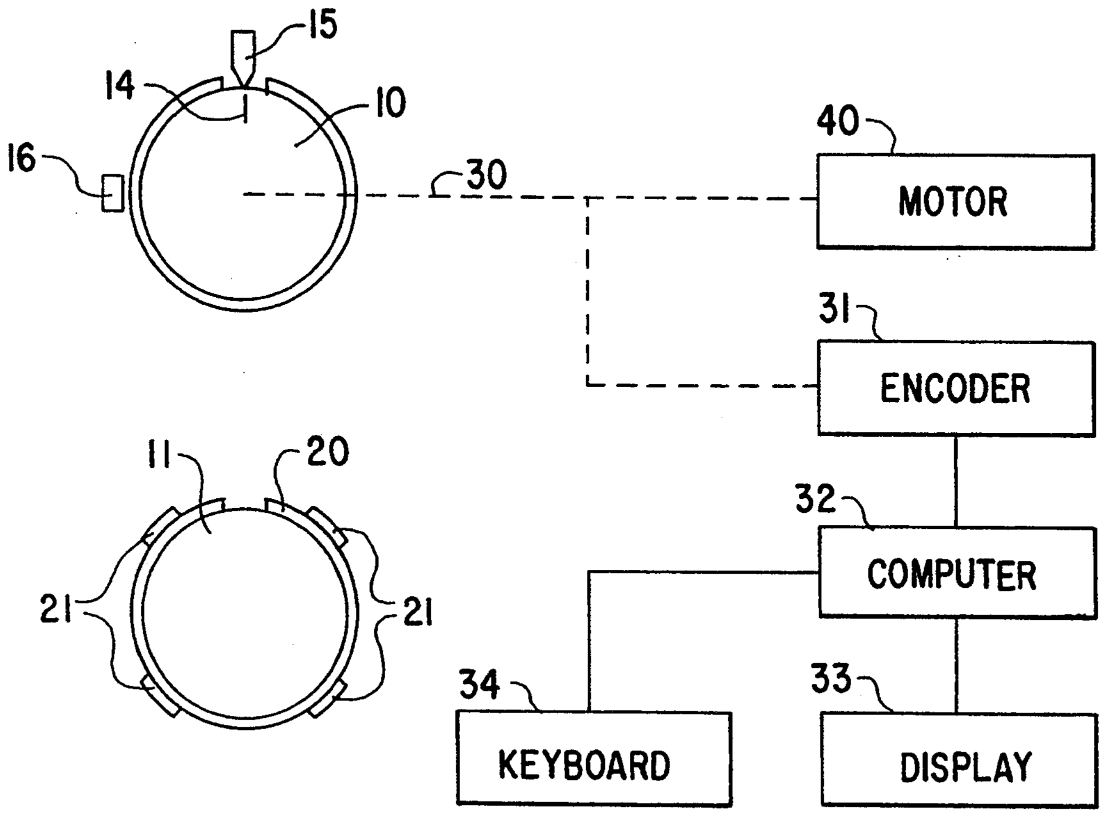
FIG. 2 is a sketch illustrating a modification of the machine of FIG. 1.

In the modification of the invention illustrated in FIG. 2, instead of providing the manual control wheel 13, the shaft 30 of the layout cylinder 10 is controlled by a motor 40. In this embodiment of the invention, the program of the computer 32 is responsive to input from the keyboard 34 to initialize itself and rotate the layout cylinder 10 to its index position. The computer is then responsive to manual input, via the keyboard 34, of the location of desired horizontal lines, to determine the compensated positions of these lines, and to control the motor 40 to rotate the cylinder 10 to the respective compensated positions.

The calculation of the compensated positions requires the input into the computer of the various parameters that are required for the calculation, such as the size of the printing press cylinder, and the thicknesses of various materials such as the backing layer and the printing plates, although some of these dimensions may be preprogrammed into the computer if "standard" dimensions are employed. For example, the printing plates are generally 0.250 inches thick, and the backing layer may have a "standard" thickness of, for example 10, 30 or 50 thousandths of an inch. The program must take into consideration the size of the layout cylinder, and this dimension may be preprogrammed into the computer since it will not vary. The thickness of the layout paper is also preferably taken into consideration, for example by either undercutting the layout cylinder or adding the thickness of this paper to the preprogrammed layout cylinder dimension.

The following Basic Language program displays prompts on the display device for the entry of determined parameters via the keyboard, and determines the percent of full size that the layout must be drawn in order to provide compensation for the parameters that have been input:

```
color 15,1:pi=3.141592654
start:
cls:locate 4,20:?"PANEL LAYOUT vs. CURVATURE –
COMPUTATION"
i1:
locate 7,10:?"Plate thickness:                    ";:line input t$:if
val(t$)=0then i1
    t=val(t$)
i2:
locate 9,10:?"Backing thickness:                  ";:line input b$:if
asc(b$)<48 and asc(b$)>57then i2
    b=val(b$)
i3:
locate 11,10:?"Panel length:                      ";:line input l$:if
val(l$)=0then i3
    l=val(l$)
i4:
locate 13,10:?"Cylinder repeat:                   ";:line input r$:if
val(r$)=0then i4
    r=val(r$)

        k1=(2*b)*pi
        r=r+k1
    k=(l-(75-(2*t*pi))/(360/(360/75*l)))'        curve comp.
on mach. plate cyl.
    p1=(l-(r-(2*t*pi))/(360/(360/r*1)))'         curve comp.
on plate

    p=l-(p1-k)
    d=(k-p1)/l
    pct=p/l*100

dspl:
locate 15,10:?"Proof size =        ";using"###.###";p
locate 15,40:?"Deviation/Inch    ";using"##.###";d
locate 18,20:?"Panel is drawn    ";using"###.##%";pct;
?" of full size"
kb:
kb$=inkey$:if kb$=""then kb
    if kb$=chr$(27)then end
    goto start
```

This program assumes that the circumference of the layout cylinder is 75 inches, and the program may be changed, within the skill of the art, to adapt the program for other diameters of the layout cylinder.

A typical display of sequentially occurring prompts and user input in response to the prompts for inputs of the plate thickness, the backing thickness, and the panel length and the cylinder repeat, and the resultant output, for the above program, is as follows:

```
PANEL LAYOUT VS CURVATURE – COMPUTATION
PLATE THICKNESS          .250
BACKING THICKNESS        .030
PANEL LENGTH              40
CYLINDER REPEAT           50
PROOF SIZE = 39.586      DEVIATION/INCH – 0.10

PANEL IS DRAWN 98.96% OF FULL SIZE
```

The results of the above calculations may be employed to control the display device to display the compensated circumferential displacement, as a function of the actual displacement of the layout cylinder.

While a plate proofing and mounting machine may be initially designed as above discussed, it is apparent that only a minimum effort and expense is required to upgrade an existing machine to incorporate the invention therein. In this latter case, it is only necessary to provide a shaft encoder on the shaft of the layout cylinder, and to provide a computer with a program as discussed above, along with a display and input device.

The present invention thereby provides a method and apparatus for the simple and accurate solution to the problem of stretching, when using a printing plate mounting and proofing machine. The invention obviates the necessity for changing the plate cylinder, and enables great accuracy in the positioning of the printing plates on the printing press cylinder, independently of the diameter of the cylinders on the mounting and proofing machine.

While the invention has been disclosed and described with reference to a limited number of embodiments it will be apparent that changes and modifications may be made therein, and it is therefore intended in the following claims to cover each such variation and modification as falls within the true spirit and scope of the invention.

What is claimed is:

1. A machine for producing a layout pattern for mounting printing plates on a printing cylinder of a printing press, comprising a rotatably mounted layout cylinder for receiving a layout sheet for the drawing of a layout pattern thereon, means for circumferentially displacing said layout cylinder, and means responsive to circumferential displacement of said layout cylinder and various diameters of said printing cylinder for determining the circumferential displacement of said layout cylinder compensated for stretch due to differing diameters of said printing cylinder and a mounting cylinder.

2. The machine of claim 1 further comprising a plate cylinder rotatable mounted parallel to said layout cylinder for proofing printing plates.

3. The machine of claim 2 wherein said plate cylinder has a diameter substantially equal to that of said layout cylinder.

4. A machine for producing a layout pattern for mounting printing plates on a printing cylinder of a printing press, comprising a rotatably mounted layout cylinder for receiving a layout sheet for the drawing of a layout pattern thereon, means for circumferentially displacing said layout cylinder, and means responsive to circumferential displacement of said layout cylinder for indicating the circumferential displacement of said layout cylinder compensated for stretch, said means for circumferentially displacing said layout cylinder including a manually operable control device for rotating said layout cylinder, and said means for indicating including an encoder coupled to said layout cylinder for producing an output responsive to circumferential displacement of said layout cylinder, a computer responsive to output from said encoder for calculating circumferential displacement of said layout cylinder compensated for stretch, and a display device for displaying said displacement of said layout cylinder compensated for stretch.

5. A method for producing a layout pattern for mounting printing plates on a printing cylinder of a printing press, comprising mounting a layout sheet on a layout cylinder of a diameter different than that of said printing cylinder, determining compensated circumferential distances on said layout sheet that differ from actual circumferential distances by amounts corresponding to stretch when said printing plates are mounted on said printing cylinder, laying out horizontal lines of said pattern on said layout sheet using said compensated distances in place of said actual distances, and laying out vertical lines on said layout sheet located at positions corresponding to actual locations on said printing cylinder.

6. The method of claim 5 wherein said step of determining compensated distances comprises encoding actual rotation of said layout cylinder, calculating compensation of distances corresponding to said actual rotation to compensate for stretch when said printing plates are mounted on said printing cylinder, and displaying said calculated distances.

7. The method of claim 6 wherein said machine has a horizontal drawing guide, comprising determining a location for a horizontal line on said layout sheet by rotating said layout cylinder until said display indicates a determined position, and drawing a line on said layout sheet at said determined position using said drawing guide.

8. An apparatus for printing plate mounting and proofing comprising a layout cylinder adapted to support a layout sheet for drawing a layout pattern thereon, means for rotating said layout cylinder, guide means for guiding drawing of lines on a layout sheet on said layout cylinder that extend parallel to the axis thereof, and a plate cylinder rotatably mounted to a extend parallel to said layout cylinder, said plate cylinder being adapted to have printing plates mounted thereon for proofing, said printing plates comprising plates manufactured for use on a cylinder having a diameter different than the diameter of said plate cylinder whereby stretch will occur in a printing press using said plates on a printing cylinder having said different diameter, the improvement comprising a display device, an encoder coupled to said layout cylinder for outputting signals corresponding to circumferential displacement of said layout cylinder, and a computing device connected to receive said signals and control the display on said display device, said computer device comprising means responsive to receipt of said signals corresponding to circumferential displacement of a given distance for displaying on said display device a number that corresponds to said given distance compensated for stretch resulting from mounting of said plates on a cylinder of said different diameter.

9. The apparatus of claim 8 wherein said layout cylinder and plate cylinder have the same diameter.

10. The apparatus of claim 8 comprising manually controllable means for rotating said layout cylinder.

11. The apparatus of claim 8 wherein said display device is a digital display device.

12. The apparatus of claim 8 further comprising an input device for said computer device for entering data in said computer device to enable computation of said compensated distance, said data comprising said different diameter and thickness of said printing plates.

13. The apparatus of claim 12 wherein said computer device has a program therein for controlling said display device to display prompts for the entry of said data.

14. The apparatus of claim 12 further comprising a motor coupled to rotate said layout cylinder, said input device comprising a keyboard for entering said given distance, said computer device comprising means responsive to input of said given distance in said keyboard for controlling said motor to rotate said compensated distance.

* * * * *